US012722388B2

(12) United States Patent
Yano

(10) Patent No.: US 12,722,388 B2
(45) Date of Patent: Sep. 1, 2026

(54) LIQUID EJECTION APPARATUS CAPABLE OF SUPPRESSING DRYING OF LIQUID AND LIQUID EJECTION METHOD

(71) Applicant: KYOCERA Document Solutions Inc., Osaka (JP)

(72) Inventor: Yuko Yano, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 205 days.

(21) Appl. No.: 18/671,117

(22) Filed: May 22, 2024

(65) Prior Publication Data

US 2024/0391244 A1 Nov. 28, 2024

(30) Foreign Application Priority Data

May 23, 2023 (JP) ................................ 2023-084612

(51) Int. Cl.
*B41J 2/175* (2006.01)
*B41J 2/18* (2006.01)

(52) U.S. Cl.
CPC ............. *B41J 2/17596* (2013.01); *B41J 2/18* (2013.01)

(58) Field of Classification Search
None
See application file for complete search history.

(56) References Cited

U.S. PATENT DOCUMENTS 6,273,546 B1 * 8/2001 Kobayashi ........... B41J 2/16511 347/29

FOREIGN PATENT DOCUMENTS

JP 2009083245 A 4/2009

* cited by examiner

*Primary Examiner* — Alejandro Valencia
(74) *Attorney, Agent, or Firm* — Alleman Hall LLP

(57) ABSTRACT

A liquid ejection apparatus includes: a liquid reception portion, a pump, and a liquid flow path. The liquid reception portion receives liquid ejected from an ejection portion on a lower side of the ejection portion. The pump is arranged apart from the liquid reception portion in a direction intersecting with a vertical direction and sucks in the liquid discharged to the liquid reception portion. The liquid flow path guides the liquid from the liquid reception portion to the pump. The liquid flow path includes first, second, and third partial flow paths. The first partial flow path extends obliquely downwardly from the liquid reception portion toward the pump side. The second partial flow path extends downwardly from an extension end portion of the first partial flow path while being bent. The third partial flow path extends upwardly from an extension end portion of the second partial flow path while being bent.

4 Claims, 5 Drawing Sheets

LIQUID EJECTION APPARATUS CAPABLE OF SUPPRESSING DRYING OF LIQUID AND LIQUID EJECTION METHOD

INCORPORATION BY REFERENCE

This application is based upon and claims the benefit of priority from the corresponding Japanese Patent Application No. 2023-084612 filed on May 23, 2023, the entire contents of which are incorporated herein by reference.

BACKGROUND

The present disclosure relates to a liquid ejection apparatus and a liquid ejection method.

An inkjet image forming apparatus includes an ejection portion including nozzles for ejecting ink toward a sheet. In this type of image forming apparatus, purge processing for causing the ink to be ejected from the ejection portion may be executed for suppressing clogging in the nozzles. For example, the image forming apparatus that executes the purge processing includes a liquid reception portion, a pump, and a liquid flow path. The liquid reception portion receives the ink ejected from the ejection portion on a lower side of the ejection portion. The pump is arranged apart from the liquid reception portion in a direction intersecting with a vertical direction and sucks in the ink discharged to the liquid reception portion. The liquid flow path guides the ink to be sucked in by the pump from the liquid reception portion to the pump.

SUMMARY

A liquid ejection apparatus according to an aspect of the present disclosure includes an ejection portion, a liquid reception portion, a pump, and a liquid flow path. The ejection portion ejects liquid. The liquid reception portion receives the liquid ejected from the ejection portion on a lower side of the ejection portion. The pump is arranged apart from the liquid reception portion in a direction intersecting with a vertical direction and sucks in the liquid discharged to the liquid reception portion. The liquid flow path guides the liquid to be sucked in by the pump from the liquid reception portion to the pump. In addition, the liquid flow path includes: a first partial flow path, a second partial flow path, and a third partial flow path. The first partial flow path extends obliquely downwardly from the liquid reception portion toward a side of the pump. The second partial flow path extends downwardly from an extension end portion of the first partial flow path while being bent. The third partial flow path extends upwardly from an extension end portion of the second partial flow path while being bent.

A liquid ejection method according to another aspect of the present disclosure is executed in the liquid ejection apparatus and includes a purge step and a stop step. The purge step includes executing purge processing for causing the liquid to be ejected from the ejection portion toward the liquid reception portion. The stop step includes stopping the pump that is driven when the purge processing is executed, before the purge processing ends.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the attached drawings. It is noted that the following embodiment is an example of embodying the present disclosure and does not limit the technical scope of the present disclosure.

[Configuration of Image Forming Apparatus 100]

Figure 1:
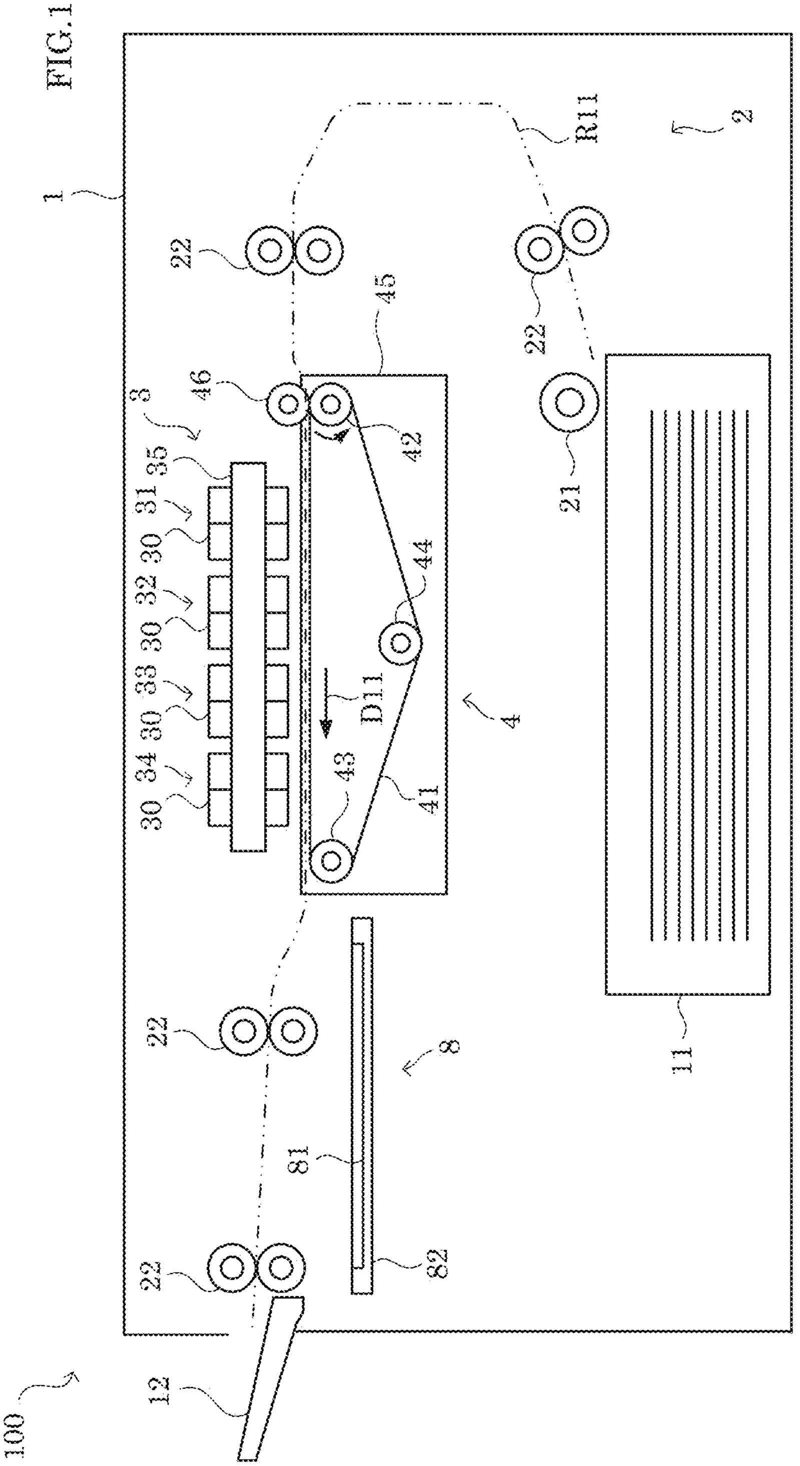
FIG. 1 is a diagram showing a configuration of an image forming apparatus according to an embodiment of the present disclosure.
Figure 2:
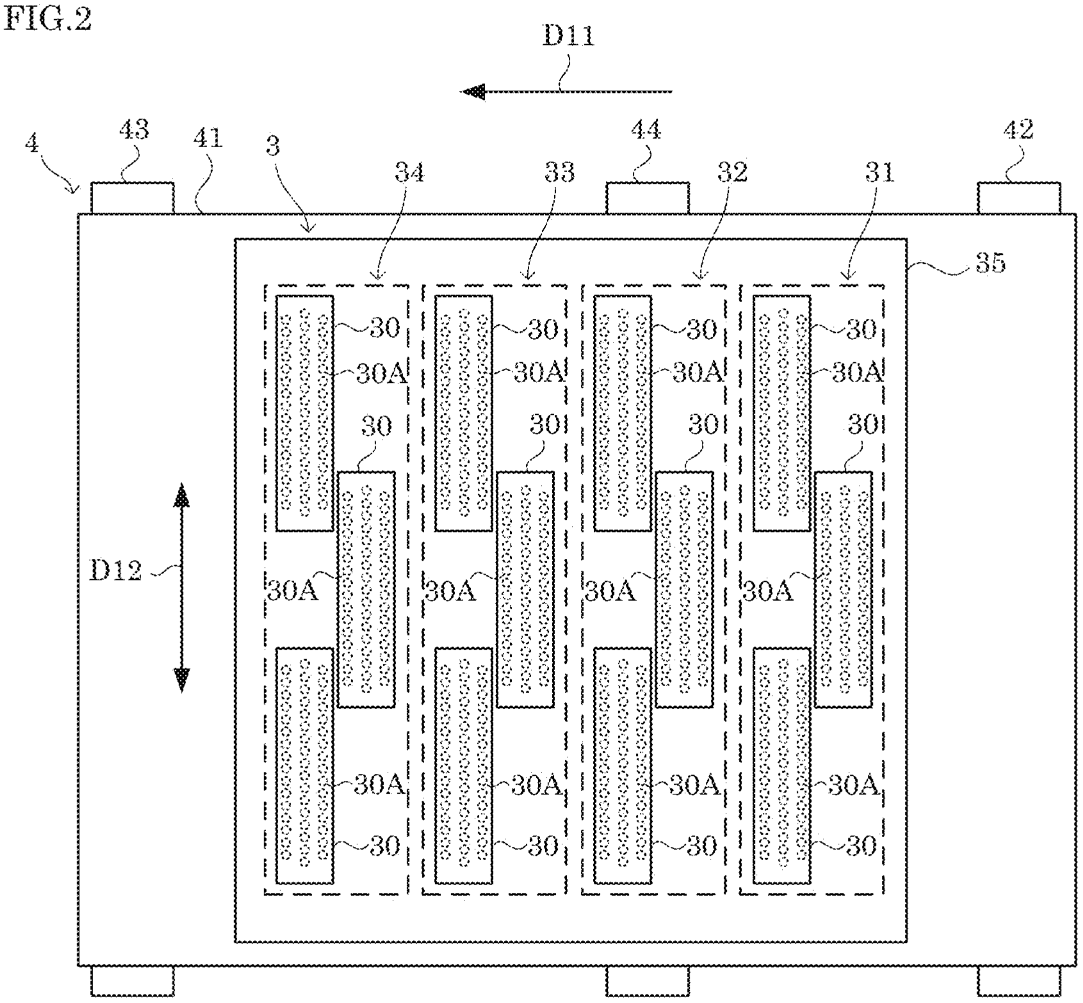
FIG. 2 is a diagram showing configurations of an image forming portion and a conveying unit in the image forming apparatus according to the embodiment of the present disclosure.

First, a configuration of an image forming apparatus 100 according to the embodiment of the present disclosure will be described with reference to FIG. 1 to FIG. 3. Herein, FIG. 1 is a cross-sectional view showing the configuration of the image forming apparatus 100. Further, FIG. 2 is a plan view showing configurations of an image forming portion 3 and a conveying unit 4. It is noted that in FIG. 1, a sheet conveying path R11 is indicated by a dash-dot-dot line.

The image forming apparatus 100 is a printer capable of forming an image on a sheet using an inkjet system. The image forming apparatus 100 is an example of a liquid ejection apparatus according to the present disclosure. It is noted that the present disclosure may also be applied to image forming apparatuses capable of forming an image on a sheet using the inkjet system, such as a facsimile apparatus, a copying machine, and a multifunction peripheral.

Figure 3:
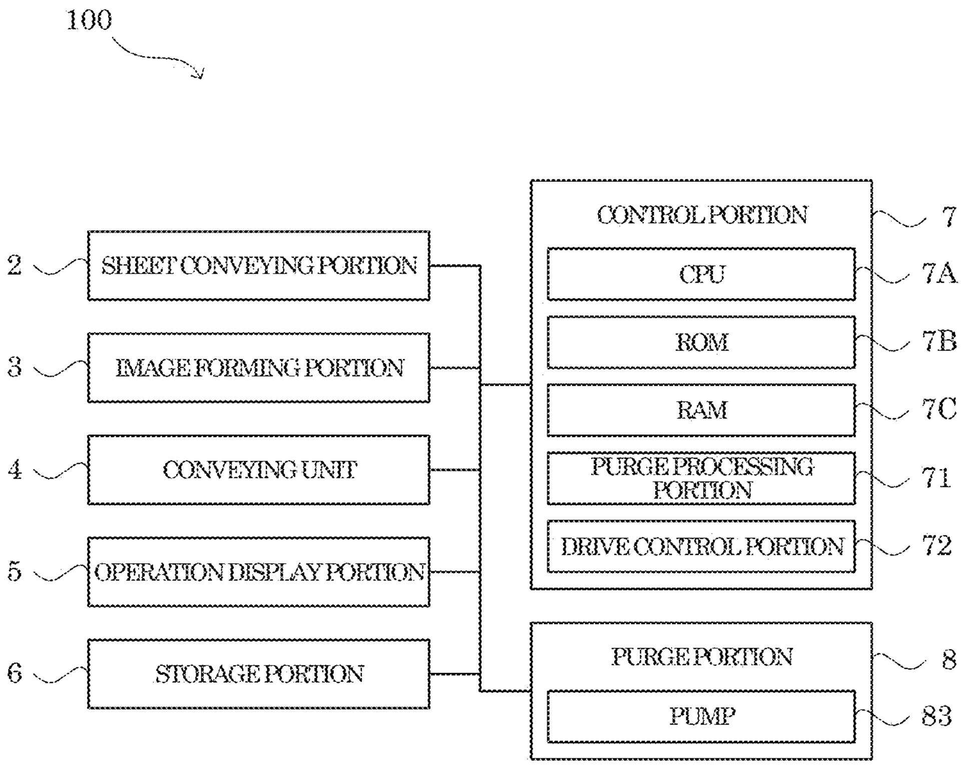
FIG. 3 is a block diagram showing a system configuration of the image forming apparatus according to the embodiment of the present disclosure.

As shown in FIG. 1 and FIG. 3, the image forming apparatus 100 includes a housing 1, a sheet conveying portion 2, the image forming portion 3, the conveying unit 4, an operation display portion 5, a storage portion 6, a control portion 7, and a purge portion 8.

The housing 1 stores respective constituent elements of the image forming apparatus 100. In the housing 1, a sheet feed cassette 11 is provided detachably. The sheet feed cassette 11 stores sheets on each of which an image is to be formed. A sheet discharge tray 12 is provided on an outer side surface of the housing 1. A sheet on which an image has been formed by the image forming portion 3 is discharged onto the sheet discharge tray 12. Inside the housing 1, the sheet stored in the sheet feed cassette 11 is conveyed along the sheet conveying path R11 (see FIG. 1) that reaches the sheet discharge tray 12 via an image forming position by the image forming portion 3.

The sheet conveying portion 2 conveys the sheet stored in the sheet feed cassette 11 along the sheet conveying path R11 (see FIG. 1). As shown in FIG. 1, the sheet conveying portion 2 includes a pickup roller 21 and a plurality of conveying rollers 22. The pickup roller 21 takes out an uppermost sheet out of a sheaf of sheets stored in the sheet feed cassette 11 and feeds the sheet to the sheet conveying path R11. The plurality of conveying rollers 22 are arranged next to one another along the sheet conveying path R11. Each of the conveying rollers 22 conveys the sheet along the sheet conveying path R11. Each of the conveying rollers 22 conveys the sheet in a conveying direction D11 (see FIG. 1) directed from the sheet feed cassette 11 toward the sheet discharge tray 12.

The image forming portion 3 forms an image that is based on image data on the sheet supplied from the sheet conveying portion 2. As shown in FIG. 1, the image forming portion 3 includes line heads 31 to 34 and a head frame 35.

As shown in FIG. 2, each of the line heads 31 to 34 is elongated in a width direction D12 orthogonal to the conveying direction D11. Specifically, each of the line heads 31 to 34 has a length in the width direction D12 corresponding to a width of a sheet of a maximum size among the sheets that can be stored in the sheet feed cassette 11. The line heads 31 to 34 are provided next to one another at regular intervals along the conveying direction D11.

As shown in FIG. 2, each of the line heads 31 to 34 includes a plurality of recording heads 30. The recording head 30 ejects ink toward the sheet conveyed by the conveying unit 4. Specifically, a large number of nozzles 30A (see FIG. 2) used for ejecting the ink are provided on an opposing surface of the recording head 30 that opposes the sheet. Each of the recording heads 30 provided in the line head 31 ejects the ink of black. Each of the recording heads 30 provided in the line head 32 ejects the ink of cyan. Each of the recording heads 30 provided in the line head 33 ejects the ink of magenta. Each of the recording heads 30 provided in the line head 34 ejects the ink of yellow. The recording head 30 is an example of an ejection portion according to the present disclosure. In addition, the ink is an example of liquid according to the present disclosure.

In the present embodiment, in the line head 31, three recording heads 30 are arranged in a staggered pattern along the width direction D12. In addition, also in each of the other line heads 32 to 34, three recording heads 30 are arranged in a staggered pattern along the width direction D12 similar to the line head 31. It is noted that FIG. 2 shows a state where the image forming portion 3 is seen from the upper side in FIG. 1.

The head frame 35 supports the line heads 31 to 34. The head frame 35 is supported by the housing 1. It is noted that the number of line heads to be provided in the image forming portion 3 may be an arbitrary number including one. In addition, the number of recording heads 30 to be provided in each of the line heads 31 to 34 may be an arbitrary number.

As shown in FIG. 1, the conveying unit 4 is arranged below the line heads 31 to 34. The conveying unit 4 conveys the sheet while the sheet opposes the recording heads 30. For example, the conveying unit 4 conveys the sheet by a predetermined conveying amount every time the ink is ejected by the recording heads 30. In addition, the conveying unit 4 stops conveying the sheet while the ejection of the ink is performed by the recording heads 30. As shown in FIG. 1, the conveying unit 4 includes a conveying belt 41 on which the sheet is to be placed, a first tension roller 42, a second tension roller 43, and a third tension roller 44 across which the conveying belt 41 is stretched, and a conveying frame 45 that supports these members. It is noted that a gap between the conveying belt 41 and the recording heads 30 is adjusted such that a gap between a front surface of a sheet and the recording heads 30 during image formation becomes a predetermined distance (for example, 1 mm).

The first tension roller 42 is rotationally driven by a rotational driving force supplied from a motor (not shown). Thus, the conveying belt 41 rotates in a direction in which the sheet can be conveyed in the conveying direction D11 (see FIG. 1). It is noted that the conveying unit 4 is also provided with a suction unit (not shown) which sucks in air from a plurality of through-holes formed in the conveying belt 41 so as to cause the sheet to stick to the conveying belt 41, or the like. In addition, a pressure roller 46 for conveying the sheet while pressing the sheet against the conveying belt 41 is provided above the first tension roller 42.

The operation display portion 5 includes a display portion such as a liquid crystal display for displaying various types of information in response to control instructions from the control portion 7 and an operation portion such as operation keys and a touch panel used for inputting various types of information to the control portion 7 according to user operations. The operation display portion 5 is provided on an upper surface of the housing 1.

The storage portion 6 is a nonvolatile storage device. For example, the storage portion 6 is a nonvolatile memory such as a flash memory.

The control portion 7 collectively controls the image forming apparatus 100. As shown in FIG. 3, the control portion 7 includes a CPU 7A, a ROM 7B, and a RAM 7C. The CPU 7A is a processor which executes various types of calculation processing. The ROM 7B is a nonvolatile storage device in which information such as control programs for causing the CPU 7A to execute various types of processing is stored in advance. The RAM 7C is a volatile or nonvolatile storage device used as a temporary storage memory (working area) for the various types of processing to be executed by the CPU 7A. The CPU 7A executes the various control programs stored in advance in the ROM 7B to collectively control the image forming apparatus 100. It is noted that the control portion 7 may be a control portion provided separate from a main control portion which collectively controls the image forming apparatus 100. Further, the control portion 7 may be configured by an electronic circuit such as an integrated circuit (ASIC).

In the image forming apparatus 100, clogging may occur in the nozzles 30A due to an increase in viscosity of the ink caused by drying, foreign matter inclusion in the nozzles 30A of the recording heads 30, and the like. In this regard, in the image forming apparatus 100, purge processing for causing the ink to be ejected from the nozzles 30A is executed for exchanging the ink in the nozzles 30A.

The purge portion 8 is used in the purge processing.

[Configuration of Purge Portion 8]

Figure 4:
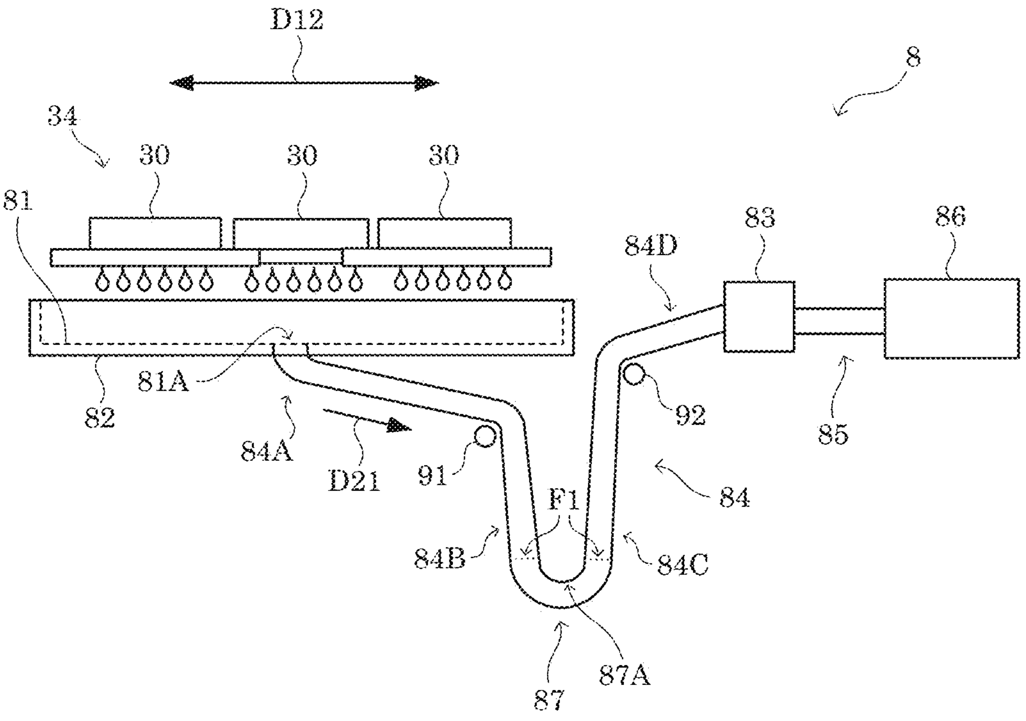
FIG. 4 is a diagram showing a configuration of a purge portion of the image forming apparatus according to the embodiment of the present disclosure.

Next, a configuration of the purge portion 8 will be described with reference to FIG. 1, FIG. 3, and FIG. 4. Herein, FIG. 4 is a side view showing the configuration of the purge portion 8. FIG. 4 shows an ink tray 81 and a carriage 82 arranged at a purge position. It is noted that FIG. 4 shows the three recording heads 30 included in the line head 34 positioned on the most downstream side of the conveying direction D11 out of the line heads 31 to 34. Moreover, in FIG. 4, a water surface F1 of the ink accumulated in an accumulation portion 87 is indicated by a dotted line.

As shown in FIG. 1, FIG. 3, and FIG. 4, the purge portion 8 includes the ink tray 81, the carriage 82, a pump 83, a guide flow path 84, a discharge flow path 85, and a waste ink tank 86. The purge portion 8 also includes a wiper member (not shown) that cleans the opposing surface of each of the recording heads 30.

Below the recording heads 30, the ink tray 81 receives the ink ejected from the nozzles 30A of the respective recording heads 30. The ink tray 81 is an example of a liquid reception portion according to the present disclosure.

The carriage 82 supports the ink tray 81 and the wiper member. The carriage 82 is supported while being movable along a vertical direction and a horizontal direction by a movement mechanism (not shown). For example, the movement mechanism is a well-known conventional driving mechanism that causes the carriage 82 to move by using a rack-and-pinion mechanism for converting a rotational movement of a gear coupled with a rotation shaft of a motor into a linear movement.

Further, in the image forming apparatus 100, the conveying unit 4 is provided to be movable in the vertical direction by a lifting mechanism (not shown). When the purge processing is executed, the conveying unit 4 is moved downwardly in the vertical direction by the lifting mechanism. Moreover, after the conveying unit 4 is moved downwardly in the vertical direction, the carriage 82 is moved by the movement mechanism to be arranged below the line heads 31 to 34. Then, the carriage 82 is moved upwardly in the vertical direction by the movement mechanism to be arranged at the purge position at which the purge processing can be executed.

When the carriage 82 is arranged at the purge position, the purge processing is executed. Specifically, in the purge processing, drive of a purge pump (not shown) is controlled by the control portion 7 so that the ink is discharged from the nozzles 30A of the respective recording heads 30 toward the ink tray 81. By executing the purge processing, highly-viscous ink remaining in the nozzles 30A of the respective recording heads 30 is discharged, and thus clogging of the nozzles 30A is eliminated.

The pump 83 is arranged apart from the ink tray 81 in a direction intersecting with the vertical direction. In other words, the pump 83 is arranged while keeping a distance from the ink tray 81 in the horizontal direction. The pump 83 sucks in the ink discharged onto the ink tray 81.

The guide flow path 84 guides the ink to be sucked in by the pump 83 from the ink tray 81 to the pump 83. Specifically, the guide flow path 84 forms an ink flow path from an ink discharge port 81A (see FIG. 4) provided at a bottom portion of the ink tray 81 to the pump 83. The guide flow path 84 is formed of a material having flexibility. For example, the guide flow path 84 is a tube formed of a resin. In the guide flow path 84, the ink sucked in by the pump 83 flows in a flowing direction D21 shown in FIG. 4. The guide flow path 84 is an example of a liquid flow path according to the present disclosure.

The discharge flow path 85 guides the ink sucked in by the pump 83 to the waste ink tank 86. Specifically, the discharge flow path 85 forms an ink flow path from the pump 83 to the waste ink tank 86. The discharge flow path 85 is formed of a material having flexibility. For example, the discharge flow path 85 is a tube formed of a resin.

The waste ink tank 86 stores the ink discharged onto the ink tray 81 by the purge processing.

Incidentally, after the pump 83 is stopped, the ink that has been unable to be sucked in by the pump 83 may remain in the guide flow path 84. When the ink remains in the guide flow path 84, the ink dries, and components contained in the ink solidify, to thus cause jam of the guide flow path 84.

In contrast, in the image forming apparatus 100 according to the embodiment of the present disclosure, drying of the ink remaining in the guide flow path 84 can be suppressed as will be described below.

Specifically, the guide flow path 84 includes a first partial flow path 84A, a second partial flow path 84B, a third partial flow path 84C, and a fourth partial flow path 84D shown in FIG. 4.

The first partial flow path 84A extends obliquely downwardly from the ink tray 81 toward the pump 83 side.

The second partial flow path 84B extends downwardly from an extension end portion of the first partial flow path 84A while being bent.

Specifically, the second partial flow path 84B extends along the vertical direction.

For example, the purge portion 8 includes a first bent portion forming portion 91 shown in FIG. 4. The first bent portion forming portion 91 comes into contact with the guide flow path 84 on the lower side of the guide flow path 84 and forms a bent portion between the first partial flow path 84A and the second partial flow path 84B. For example, the first bent portion forming portion 91 is a stick-type or cylindrical member that supports the guide flow path 84 from the lower side of the guide flow path 84. The guide flow path 84 is supported by the first bent portion forming portion 91 such that the pump 83 side thereof hangs down in the vertical direction. Thus, the bent portion between the first partial flow path 84A and the second partial flow path 84B is formed.

The third partial flow path 84C extends upwardly from an extension end portion of the second partial flow path 84B while being bent.

Specifically, the third partial flow path 84C extends along the vertical direction.

The fourth partial flow path 84D extends from an extension end portion of the third partial flow path 84C while being bent in an upward oblique direction with respect to the horizontal direction. An extension end portion of the fourth partial flow path 84D is connected to the pump 83.

For example, the purge portion 8 includes a second bent portion forming portion 92 shown in FIG. 4. The second bent portion forming portion 92 comes into contact with the guide flow path 84 on the lower side of the guide flow path 84 and forms a bent portion between the third partial flow path 84C and the fourth partial flow path 84D. For example, the second bent portion forming portion 92 is a stick-type or cylindrical member that supports the guide flow path 84 from the lower side of the guide flow path 84. The guide flow path 84 is supported by the second bent portion forming portion 92 such that the ink tray 81 side thereof hangs down in the vertical direction. Thus, the bent portion between the third partial flow path 84C and the fourth partial flow path 84D is formed.

In the guide flow path 84, a U-shaped bent portion in a side view is formed between the second partial flow path 84B and the third partial flow path 84C. The U-shaped bent portion functions as the accumulation portion 87 in which the ink that has been unable to be sucked in by the pump 83 is aggregated and accumulated after the stop of the pump 83.

Specifically, since the first partial flow path 84A extends obliquely downwardly, the ink remaining in the first partial flow path 84A flows to the second partial flow path 84B by its own weight. In addition, since the second partial flow path 84B extends downwardly in the vertical direction, the ink remaining in the second partial flow path 84B flows to the accumulation portion 87 by its own weight. Further, since the fourth partial flow path 84D extends obliquely upwardly, the ink remaining in the fourth partial flow path 84D flows to the third partial flow path 84C by its own weight. Furthermore, since the third partial flow path 84C extends upwardly in the vertical direction, the ink remaining in the third partial flow path 84C flows to the accumulation portion 87 by its own weight.

By aggregating and accumulating the ink remaining in the guide flow path 84 in the accumulation portion 87, a contact area between the ink and air can be made smaller than that in a case where the ink is not aggregated. Thus, drying of the ink remaining in the guide flow path 84 can be suppressed.

Herein, in the image forming apparatus 100, the accumulation portion 87 is formed in a U shape in a side view. Thus, a contact area between the ink accumulated in the accumulation portion 87 and air can additionally be made smaller than that of a configuration in which the accumulation portion 87 is formed in a V shape in the side view.

It is noted that the accumulation portion 87 may be formed in the V shape in the side view. Specifically, the second partial flow path 84B may be formed to extend obliquely downwardly toward the pump 83 side at a tilted angle steeper than that of the first partial flow path 84A. Moreover, the third partial flow path 84C may be formed to extend obliquely upwardly toward the pump 83 side at a tilted angle steeper than that of the fourth partial flow path 84D.

Further, as shown in FIG. 3, the control portion 7 includes a purge processing portion 71 and a drive control portion 72.

Specifically, an ejection function recovery program for causing the CPU 7A of the control portion 7 to function as the respective portions described above is stored in advance in the ROM 7B of the control portion 7. Then, the CPU 7A of the control portion 7 executes the ejection function recovery program stored in the ROM 7B to function as the respective functional portions described above. It is noted that a part or all of the functional portions included in the control portion 7 may be configured by an electronic circuit. Alternatively, the ejection function recovery program may be a program for causing a plurality of processors to function as the respective functional portions included in the control portion 7.

The purge processing portion 71 executes the purge processing for causing the ink to be ejected from the recording heads 30 toward the ink tray 81.

The drive control portion 72 drives the pump 83 when the purge processing is executed.

For example, when the purge processing is executed, the drive control portion 72 drives the pump 83 before the purge processing is started.

In addition, the drive control portion 72 stops the pump 83 that is driven when the purge processing is executed, before the purge processing ends. The drive control portion 72 is an example of a stop processing portion according to the present disclosure.

[Ejection Function Recovery Processing]

Figure 5:
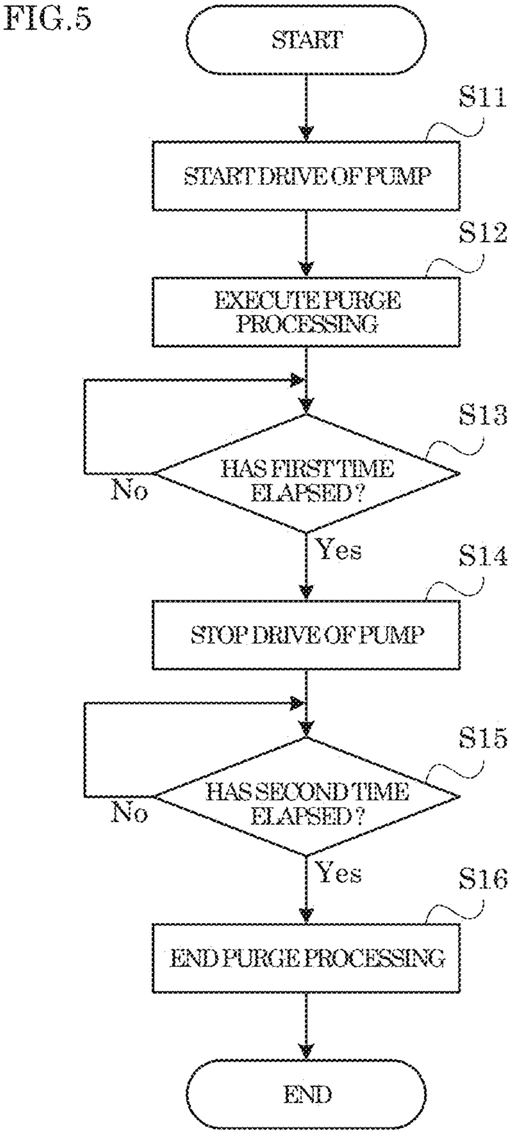
FIG. 5 is a flowchart showing an example of ejection function recovery processing executed in the image forming apparatus according to the embodiment of the present disclosure.

Hereinafter, with reference to FIG. 5, a liquid ejection method according to the present disclosure will be described along with exemplary procedures of ejection function recovery processing executed by the control portion 7 in the image forming apparatus 100. Herein, Step S11, Step S12, . . . represent numbers of processing procedures (steps) executed by the control portion 7. It is noted that the ejection function recovery processing is executed when an execution timing of the purge processing arrives. For example, the control portion 7 determines that the execution timing has arrived when an elapsed time since execution of last image forming processing exceeds a predetermined reference time. Alternatively, the control portion 7 may determine that the execution timing has arrived when a predetermined operation is accepted in the operation display portion 5.

<Step S11>

First, in Step S11, the control portion 7 starts drive of the pump 83. Herein, the processing of Step S11 is executed by the drive control portion 72 of the control portion 7.

<Step S12>

In Step S12, the control portion 7 executes the purge processing after the start of the drive of the pump 83. Herein, the processing of Step S12 is an example of a purge step according to the present disclosure and is executed by the purge processing portion 71 of the control portion 7.

Herein, in the ejection function recovery processing, the pump 83 is driven before the purge processing is started. Thus, the ink that has been accumulated in the accumulation portion 87 during execution of the last ejection function recovery processing is recovered in the waste ink tank 86 before execution of the purge processing. Therefore, an increase of a driving load of the pump 83 can be avoided as compared to a configuration in which the pump 83 is driven at the same time as or after the start of the purge processing.

<Step S13>

In Step S13, the control portion 7 determines whether or not a predetermined first time has elapsed since the start of the purge processing.

Herein, when determining that the first time has elapsed (Yes in Step S13), the control portion 7 shifts the processing to Step S14. On the other hand, when determining that the first time has not elapsed (No in Step S13), the control portion 7 stands by until the first time elapses in Step S13.

<Step S14>

In Step S14, the control portion 7 stops the drive of the pump 83 before the purge processing ends. Herein, the processing of Step S14 is an example of a stop step according to the present disclosure and is executed by the drive control portion 72 of the control portion 7.

Thus, the water surface F1 (see FIG. 4) of the ink accumulated in the accumulation portion 87 after the purge processing is ended can be set to become higher than a top surface 87A of the U-shaped bent portion (see FIG. 4). Therefore, the contact area between the ink and air can be made smaller.

Herein, a water level of the ink accumulated in the accumulation portion 87 after the purge processing is ended becomes higher as an execution time of the purge processing since the stop of the drive of the pump 83 becomes longer. In other words, by adjusting a drive stop timing of the pump 83, the water level of the ink accumulated in the accumulation portion 87 after the purge processing is ended can be controlled.

<Step S15>

In Step S15, the control portion 7 determines whether or not a predetermined second time has elapsed since the start of the purge processing. The second time is a predetermined execution time of the purge processing and is longer than the first time.

Herein, when determining that the second time has elapsed (Yes in Step S15), the control portion 7 shifts the processing to Step S16. On the other hand, when determining that the second time has not elapsed (No in Step S15), the control portion 7 stands by until the second time elapses in Step S15.

<Step S16>

In Step S16, the control portion 7 ends the purge processing.

In this manner, in the image forming apparatus 100, the accumulation portion 87 that aggregates and accumulates the ink that has been unable to be sucked in by the pump 83 after the stop of the pump 83 is formed by the first partial flow path 84A, the second partial flow path 84B, the third partial flow path 84C, and the fourth partial flow path 84D included in the guide flow path 84. Thus, drying of the ink remaining in the guide flow path 84 can be suppressed.

It is noted that the guide flow path 84 does not need to include the fourth partial flow path 84D. Specifically, the pump 83 may be connected to the extension end portion of the third partial flow path 84C.

Further, a part or all of the guide flow path 84 may be formed of a material not having flexibility. For example, the second partial flow path 84B, the third partial flow path 84C, and the fourth partial flow path 84D may be pipes formed of metal. In this case, the purge portion 8 does not need to include the first bent portion forming portion 91 and the second bent portion forming portion 92.

In addition, the liquid according to the present disclosure is not limited to the ink and may be a coating agent that covers a front surface of a to-be-ejected target.

NOTES OF DISCLOSURE

Hereinafter, a general outline of the disclosure extracted from the embodiment described above will be noted. It is noted that the respective configurations and processing functions described in the notes below can be sorted and arbitrarily combined as appropriate.

<Note 1>

A liquid ejection apparatus, including: an ejection portion which ejects liquid; a liquid reception portion which receives the liquid ejected from the ejection portion on a lower side of the ejection portion; a pump which is arranged apart from the liquid reception portion in a direction intersecting with a vertical direction and sucks in the liquid discharged to the liquid reception portion; and a liquid flow path which guides the liquid to be sucked in by the pump from the liquid reception portion to the pump, in which the liquid flow path includes: a first partial flow path extending obliquely downwardly from the liquid reception portion toward a side of the pump; a second partial flow path extending downwardly from an extension end portion of the first partial flow path while being bent; and a third partial flow path extending upwardly from an extension end portion of the second partial flow path while being bent.

<Note 2>

The liquid ejection apparatus according to Note 1, in which the second partial flow path extends along the vertical direction, and the third partial flow path extends along the vertical direction.

<Note 3>

The liquid ejection apparatus according to Note 1 or 2, in which the liquid flow path includes a fourth partial flow path which extends obliquely upwardly from an extension end portion of the third partial flow path while being bent and has an extension end portion connected to the pump.

<Note 4>

The liquid ejection apparatus according to any one of Notes 1 to 3, in which the liquid flow path is formed of a material having flexibility, and the liquid ejection apparatus includes a bent portion forming portion which comes into contact with the liquid flow path on a lower side of the liquid flow path and forms a bent portion between the first partial flow path and the second partial flow path.

<Note 5>

The liquid ejection apparatus according to any one of Notes 1 to 4, including: a purge processing portion which executes purge processing for causing the liquid to be ejected from the ejection portion toward the liquid reception portion; and a stop processing portion which stops the pump that is driven when the purge processing is executed, before the purge processing ends.

<Note 6>

A liquid ejection method executed in the liquid ejection apparatus according to any one of Notes 1 to 4, including: a purge step of executing purge processing for causing the liquid to be ejected from the ejection portion toward the liquid reception portion; and a stop step of stopping the pump that is driven when the purge processing is executed, before the purge processing ends.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A liquid ejection apparatus, comprising:

an ejection portion which ejects liquid;

a liquid reception portion which receives the liquid ejected from the ejection portion on a lower side of the ejection portion;

a pump which is arranged apart from the liquid reception portion in a direction intersecting with a vertical direction and sucks in the liquid discharged to the liquid reception portion; and a liquid flow path which guides the liquid to be sucked in by the pump from the liquid reception portion to the pump, wherein the liquid flow path includes:

a first partial flow path extending obliquely downwardly from the liquid reception portion toward a side of the pump;

a second partial flow path extending downwardly from an extension end portion of the first partial flow path while being bent; and a third partial flow path extending upwardly from an extension end portion of the second partial flow path while being bent, wherein, in the liquid flow path, an accumulation portion that bends in a U-shape is formed between the second partial flow path and the third partial flow path, and wherein the liquid ejection apparatus further includes:

a purge processing portion which executes purge processing for causing the ejection portion to eject the liquid toward the liquid reception portion; and a stop processing portion which stops the pump that is driven when the purge processing is executed, at a timing before the purge processing ends and at which a level of the liquid accumulated in the accumulation portion after the purge processing is ended becomes higher than a top surface of the accumulation portion.

2. The liquid ejection apparatus according to claim 1, wherein the liquid flow path includes a fourth partial flow path which extends obliquely upwardly from an extension end portion of the third partial flow path while being bent and has an extension end portion connected to the pump.

3. The liquid ejection apparatus according to claim 1, wherein the liquid flow path is formed of a material having flexibility, and the liquid ejection apparatus further comprises:

a bent portion forming portion which comes into contact with the liquid flow path on a lower side of the liquid flow path and forms a bent portion between the first partial flow path and the second partial flow path.

4. A liquid ejection method executed in a liquid ejection apparatus including: an ejection portion which ejects liquid; a liquid reception portion which receives the liquid ejected from the ejection portion on a lower side of the ejection portion; a pump which is arranged apart from the liquid reception portion in a direction intersecting with a vertical direction and sucks in the liquid discharged to the liquid reception portion; and a liquid flow path which guides the liquid to be sucked in by the pump from the liquid reception portion to the pump, wherein the liquid flow path includes: a first partial flow path extending obliquely downwardly from the liquid reception portion toward a side of the pump; a second partial flow path extending downwardly from an extension end portion of the first partial flow path while being bent; and a third partial flow path extending upwardly from an extension end portion of the second partial flow path while being bent, wherein, in the liquid flow path, an accumulation portion that bends in a U-shape is formed between the second partial flow path and the third partial flow path, the liquid ejection method comprising:

a purge step of executing purge processing for causing the liquid to be ejected from the ejection portion toward the liquid reception portion; and a stop step of stopping the pump that is driven when the purge processing is executed, at a timing before the purge processing ends and at which a level of the liquid accumulated in the accumulation portion after the purge processing is ended becomes higher than a top surface of the accumulation portion.

* * * * *